3,310,936
POWER PLANTS
Alexander Stewart, Breadsall, and Kenneth Arnold Basford, Alvaston, England, assignors to Rolls-Royce Limited, Derby, England
Filed May 10, 1965, Ser. No. 454,595
Claims priority, application Great Britain, June 5, 1964, 23,528/64
2 Claims. (Cl. 60—39.14)

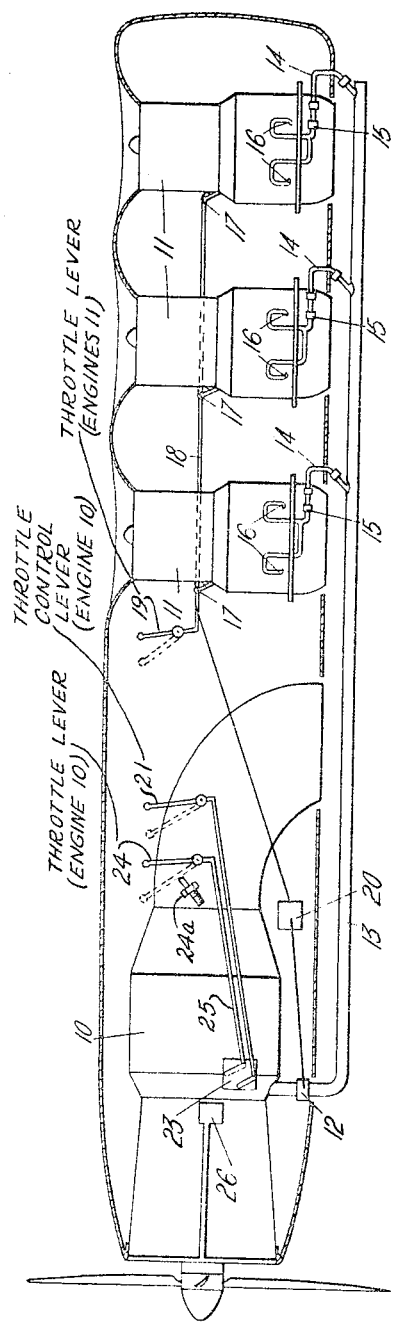

This invention relates to power plants for aircraft.

According to this invention a power plant for an aircraft comprises a forward propulsion propeller-turbine engine and at least one vertical propulsion gas-turbine engine and duct means whereby compressed air from the propeller-turbine engine may be conveyed to the, or each, vertical-propulsion gas turbine engine for starting purposes.

There may be a valve in said duct means between said propeller-turbine engine and said gas-turbine engines, said valve being operatively associated with throttles on said gas-turbine engines so that opening of said throttles from the closed position to a partly open position opens said valve to allow compressed air from said propeller turbine engine to pass to said gas-turbine engines.

Said valve may be operatively associated with said throttles so that opening of said throttles to their fully open positions closes said valve.

The invention will be described with reference to the drawing which shows an elevational view of an aircraft power plant.

Referring to the drawing, a power plant according to the invention has a forward propulsion propeller turbine engine 10 and three vertical propulsion gas turbine engines 11. From the engine 10 a valve 12 controls the flow of air bled from the compressor delivery to a duct 13 and hence to each of the engines 11.

The duct 13 has three branch ducts 14 each of which carries bleed air via non-return valves 15 to nozzles 16, two of which are shown on each engine 11. The nozzles 16 direct the bleed air on to the turbine blades (not shown) of the engines 11 to spin the turbines and hence to provide the necessary rotation of the rotating parts of the engines 11 to enable these to be started up.

Throttle levers 17 on each of the engines 11 control the flow of fuel to the engines, are linked by an actuating link 18 which is moved by a single pilot's throttle lever 19. The link 18 communicates with the valve 12 via a controller 20.

The pilot also has a throttle control lever 21 which actuates, by way of a link 22, a throttle 23 on the engine 10. A trim lever 24 also acts by a link 25 on a device which acts as a trimmer on the throttle 23. The trim lever 24 has a variable stop 26 which acts to limit its maximum travel to a pre-set value.

The engine 10 may be provided with thrust augmenting means comprising a device for the injection of water-methanol at the intake of the engine 10. A control unit 26 is provided to vary the flow of water-methanol to suit the torque developed by the engine.

The operation of the entire power plant on starting up and take-off of the aircraft which it powers is as follows. The forward propulsion engine 10 is started in a known manner. The stop 24a on the trim lever 24 is set to suit the ambient conditions of pressure and temperature. The trim lever 24 is set at its low power setting, and a water-methanol pump switched on by a switch.

The throttle lever 19 is then moved from its "off" position to a "light-up" position. Movement of the link 18 caused by the action opens the throttle 17 of the engines 11 and at the same time, causes the valve 12 to be opened by the controller 20. Simultaneously ignition devices (not shown) for the engines 11 are switched on either separately or by the movement of the throttle 19.

The engines 11 should thus light up, since their turbines are spun by the bleed air from the couples 16 and combustion of the fuel/air mixture is initiated by the abovementioned ignition devices.

The throttle 19 is now moved to an "idle" position, at which more fuel is fed to the engines 11. At the same time the ignition devices are switched off.

To take-off, the throttle 19 is moved to Maximum Take-Off position. The ensuing movement of the links 18 causes the controller 20 to switch off the valve 12. The engines 11 then will produce maximum thrust for take-off.

The trim-lever 24 is now opened up until it abuts the stop 26. This enables the engine 10 to produce maximum dry thrust. A cock is now opened by a switch. Water-methanol builds up steadily under the action of a controller until the engine 10 produces its maximum take off thrust.

All the engines of the power plant are now of maximum thrust, and the aircraft can be taken off the ground. When the aircraft reaches sufficient height the engines 11 may be shut off and the engine 10 brought down to cruising power.

We claim:
1. In a power plant for an aircraft having a forward propulsion propeller-turbine engine including an air compressor means and at least one vertical propulsion gas-turbine engine, including means responsive to compressed air for starting purposes, and duct means for conveying compressed air from the propeller-turbine engine to said vertical propulsion engine, the improvement comprising:
   a throttle lever means connected to throttle means associated with said vertical propulsion engine and to a valve means in said duct means, said throttle lever means having a first position wherein said associated throttle means is partly opened and said duct is fully opened, whereby said vertical propulsion engine can be started by the compressed air flowing from the propeller-turbine engine and through said duct means, and wherein said throttle lever means further has a second position which opens further said associated throttle means while simultaneously closing said duct means.
2. The improvement of claim 1 wherein said power plant includes a plurality of vertical propulsion engines and wherein a separate throttle means is associated with each vertical propulsion engine of said plurality, whereby all throttle means are operated by movement of said throttle lever.

References Cited by the Examiner
UNITED STATES PATENTS

| 2,863,282 | 12/1958 | Torell | 60—39.3 X |
| 2,919,548 | 1/1960 | Herbstritt | 60—39.26 |
| 2,988,882 | 6/1961 | Hollings | 60—39.14 X |

FOREIGN PATENTS

| 703,619 | 2/1954 | Great Britain. |

JULIUS E. WEST, Primary Examiner.